(12) United States Patent
Dimitri et al.

(10) Patent No.: US 6,839,802 B2
(45) Date of Patent: Jan. 4, 2005

(54) METHOD, SYSTEM, AND PROGRAM FOR WRITING FILES TO ZONE FORMATTED STORAGE MEDIA TO IMPROVE DATA TRANSFER RATES

(75) Inventors: Kamal Emile Dimitri, Tucson, AZ (US); John Edward Kulakowski, Tucson, AZ (US); Rodney Jerome Means, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 09/732,639

(22) Filed: Dec. 8, 2000

(65) Prior Publication Data

US 2002/0095546 A1 Jul. 18, 2002

(51) Int. Cl.$^7$ .............................................. G06F 12/00
(52) U.S. Cl. ......................... 711/112; 711/171; 711/202
(58) Field of Search ........................ 711/202, 170–173, 711/111, 112

(56) References Cited

U.S. PATENT DOCUMENTS

| | | | |
|---|---|---|---|
| 5,210,660 A | 5/1993 | Hetzler | 360/51 |
| 5,353,181 A | 10/1994 | Frater et al. | 360/245.3 |
| 5,440,474 A | 8/1995 | Hetzler | 360/135 |
| 5,559,765 A | 9/1996 | Andou | 369/30.12 |
| 5,852,705 A * | 12/1998 | Hanko et al. | 386/92 |
| 5,878,020 A | 3/1999 | Takahashi | 369/59.25 |
| 5,896,364 A | 4/1999 | Okazaki et al. | 369/275.3 |
| 6,014,349 A | 1/2000 | Iwasaki et al. | 369/47.28 |
| 6,028,828 A | 2/2000 | Maeda | 369/47.4 |
| 6,052,347 A | 4/2000 | Miyata | 369/47.53 |
| 6,128,717 A * | 10/2000 | Harrison et al. | 711/202 |
| 6,327,638 B1 * | 12/2001 | Kirby | 711/4 |
| 6,496,913 B1 * | 12/2002 | Taugher et al. | 711/170 |

* cited by examiner

*Primary Examiner*—Matthew Kim
*Assistant Examiner*—Shane M Thomas
(74) *Attorney, Agent, or Firm*—David W. Victor; Konrad Raynes & Victor LLP (57) ABSTRACT

Disclosed is a system, method, and program for writing data to a storage medium formatted into a plurality of zones. Each zone comprises at least one circumferential track, each track comprises a plurality of addressable sectors, and the innermost zones have fewer sectors than outermost zones. A request is received to write a file to the storage medium. A determination is made of a utilization factor for the file and one zone for the file based on the determined utilization factor. The file is written to the determined zone.

50 Claims, 7 Drawing Sheets

| Zone | Sectors per Revolution per Surface | Revolutions per Minute | Megabytes (Mb) per Second Under Head |
|---|---|---|---|
| 0 (Outer) | 315 | 5400 | 14.51 |
| 1 | 306 | 5400 | 14.10 |
| 2 | 300 | 5400 | 13.82 |
| 3 | 288 | 5400 | 13.27 |
| 4 | 282 | 5400 | 12.99 |
| 5 | 270 | 5400 | 12.44 |
| 6 | 258 | 5400 | 11.89 |
| 7 | 247 | 5400 | 11.38 |
| 8 | 240 | 5400 | 11.06 |
| 9 | 234 | 5400 | 10.78 |
| 10 | 225 | 5400 | 10.37 |
| 11 | 216 | 5400 | 9.95 |
| 12 | 210 | 5400 | 9.67 |
| 13 | 198 | 5400 | 9.12 |
| 14 | 192 | 5400 | 8.84 |
| 15 (inner) | 180 | 5400 | 8.29 |

| Zone | Sectors per Revolution per Surface | Revolutions per Minute | Megabytes (Mb) per Second Under Head |
|---|---|---|---|
| 0 (Outer) | 315 | 5400 | 14.51 |
| 1 | 306 | 5400 | 14.10 |
| 2 | 300 | 5400 | 13.82 |
| 3 | 288 | 5400 | 13.27 |
| 4 | 282 | 5400 | 12.99 |
| 5 | 270 | 5400 | 12.44 |
| 6 | 258 | 5400 | 11.89 |
| 7 | 247 | 5400 | 11.38 |
| 8 | 240 | 5400 | 11.06 |
| 9 | 234 | 5400 | 10.78 |
| 10 | 225 | 5400 | 10.37 |
| 11 | 216 | 5400 | 9.95 |
| 12 | 210 | 5400 | 9.67 |
| 13 | 198 | 5400 | 9.12 |
| 14 | 192 | 5400 | 8.84 |
| 15 (inner) | 180 | 5400 | 8.29 |

FIG. 4

| Zone | Sectors per Revolution per Surface | Tracks per Zone | Sectors per Zone | Percentage Total Capacity |
|---|---|---|---|---|
| 0 (Outer) | 315 | 373 | 117,495 | 6% (5.5%) |
| 1 | 306 | 430 | 131,580 | 6% (6.1%) |
| 2 | 300 | 492 | 147,600 | 7% (6.9%) |
| 3 | 288 | 881 | 253,728 | 12% (11.8%) |
| 4 | 282 | 478 | 134,796 | 6% (6.3%) |
| 5 | 270 | 1212 | 327,240 | 15% (15.2%) |
| 6 | 258 | 405 | 104,490 | 5% (4.9%) |
| 7 | 247 | 608 | 150,176 | 7.0 % (7.0%) |
| 8 | 240 | 411 | 98,640 | 5% (4.6%) |
| 9 | 234 | 419 | 98,046 | 5% (4.6%) |
| 10 | 225 | 366 | 82,350 | 4% (3.8%) |
| 11 | 216 | 421 | 90,936 | 4% (4.2%) |
| 12 | 210 | 358 | 75,180 | 4% (3.5%) |
| 13 | 198 | 603 | 119,394 | 6% (5.5%) |
| 14 | 192 | 357 | 68,544 | 3% (3.2%) |
| 15 (inner) | 180 | 585 | 105,300 | 5% (4.9%) |

METHOD, SYSTEM, AND PROGRAM FOR WRITING FILES TO ZONE FORMATTED STORAGE MEDIA TO IMPROVE DATA TRANSFER RATES

BACKGROUND OF THE INVENTION

1. Field of the Invention

The present invention relates to a method, system, and program for writing files to zone formatted storage media.

2. Description of the Related Art

Figure 1:
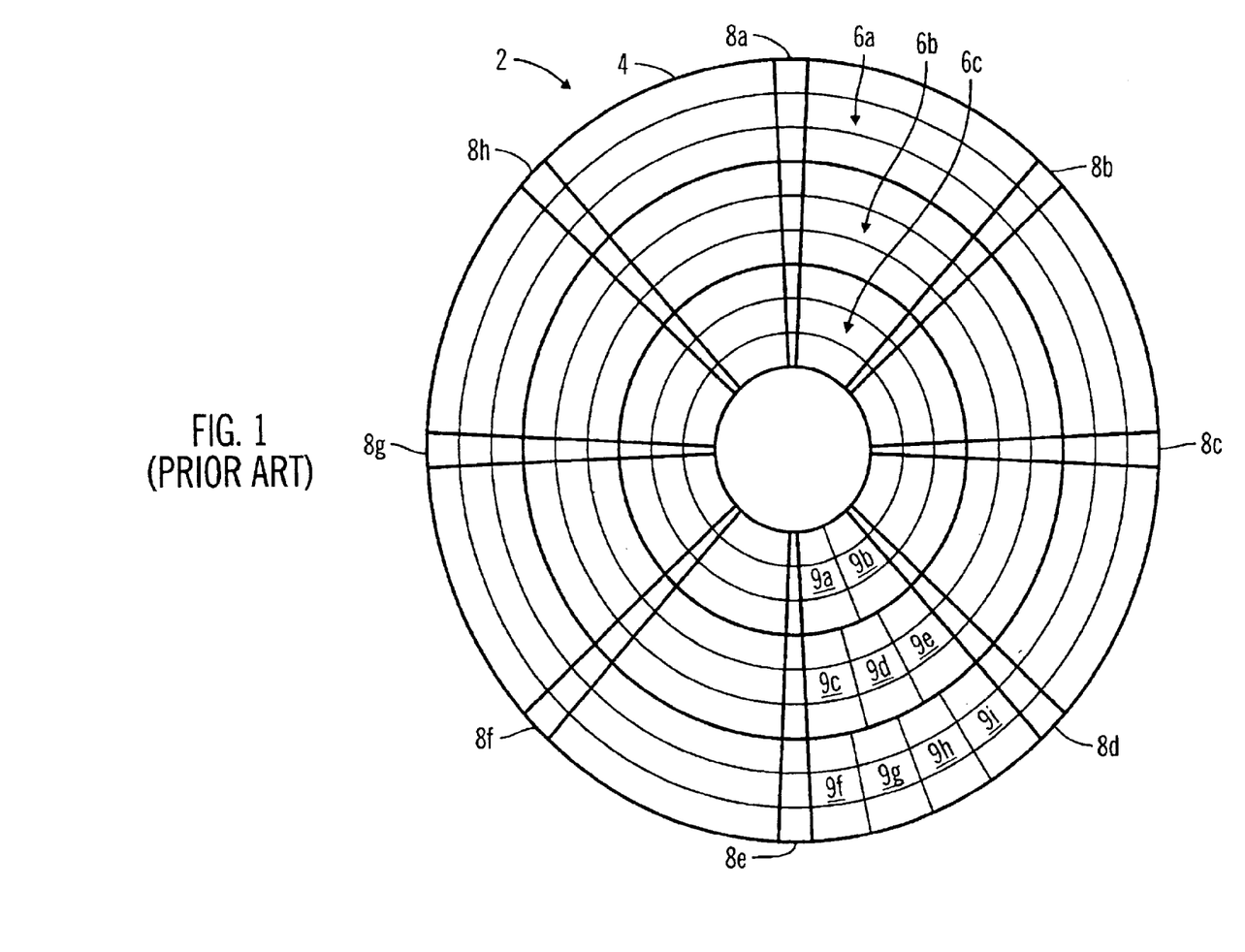
FIG. 1 illustrates the arrangement of data within a recording disk in accordance with the prior art.

A hard disk drive receives input/output (I/O) commands with respect to locations on the disk. The I/O commands cause a controller that manages I/O operations for the disk to perform the requested I/O operation with respect to a target location. FIG. 1 illustrates a prior art arrangement of a recording surface of a disk 2 divided into concentric circular "tracks" on the disk surface. If there are multiple disks, then the vertical alignment of the tracks, on the disks aligned in parallel, together comprise a cylinder. The outer cylinder is shown as reference 4. Each cylinder is further divided into user data zones 6a, b, c and prerecorded servo sectors 8a–h. Data zones 6a, b, c are further divided into data sectors 9a–i. Prerecorded servo sectors 8a–h are contiguous from the inner radius to the outer radius of the formatted disk. A logical block address ("LBA") is used to address a specific location on the stack, or within a stack of multiple disks, and is mapped by the disk controller to a cylinder or track, head number indicating a particular head in a multi-disk system, and sector. A data sector is the smallest unit that can be accessed on the disk, such as a 512 byte block identified by a LBA. FIG. 1 shows the data sectors 9a–i formatted between servo sectors 8e and 8d. Similar data sectors would be formatted between the other servo sectors. As can be seen, there are more data sectors in the outer zones than the inner zones. Prerecorded servo sectors 8a–h may actually split data sectors 9a–i as there need not be an integral number of data sectors between adjacent servo sectors. Data sectors 9a–i are aligned within their respective data zones 6a–c (FIG. 1). However, it is also possible that the data sectors do not align within their respective data zones.

The positioning time or total access time for an individual command can be broken-up into sequential phases, referred to as seek time and latency time. Seek time is the time period for the servo system to position the actuator from the current head and cylinder position to the new target head and cylinder position. The latency time represents the remaining positioning time, after seek completes, to position the head over the target sector. A "rotational time" involves the time to rotate the sector from the current sector location to position the target sector under the transducer read/write head. Thus, the total access time is determined by two time movement operations, the seek time for radial positioning and the rotational access time for circumferential positioning the head over the target sector, as well as the time to transfer the data through the head to perform the I/O operation. For files comprising multiple sectors, the access time could further include the time to move the head to another sector including file data after transferring data with respect to one sector of the file and then transfer the data through the head to the next sector.

FIG. 1 illustrates a format of a disk that is arranged into zones of consecutive tracks. Zone 6a includes the outermost tracks, zone 6b those in the middle, and zone 6c the innermost tracks. Although only three zones are shown in the illustration of FIG. 1, in actual implementations there are numerous zones as there are numerous tracks on a disk recording surface. In the prior art, data is placed on a zone according to a particular algorithm. One prior art algorithm is to start writing data to the middle zone 6b and then alternate writing data to the first available tracks in both radial directions. The goal of this prior art algorithm is to minimize the seek time the head must radially move to different tracks to access different blocks of data. Other algorithms may start from the outermost or innermost zones and then write data inward or outward, respectively, to the first available blocks or sectors.

Although the algorithm that starts writing toward the middle zone and then writes further data both outward and inward minimizes seek time, such an algorithm is not particularly optimal for retrieving data from large files where the seek time is a very small fraction of the total data transfer time.

Accordingly, there is a need in the art to improve upon the algorithm for determining a location of where to write new data to optimize the data transfer time.

SUMMARY OF THE PREFERRED EMBODIMENTS

Preferred embodiments disclose a system, method, and program for writing data to a storage medium formatted into a plurality of zones. Each zone comprises at least one circumferential track, each track comprises a plurality of addressable sectors, and the innermost zones have fewer sectors than outermost zones. A request is received to write a file to the storage medium. A determination is made of a utilization factor for the file and one zone for the file based on the determined utilization factor. The file is written to the determined zone.

In further embodiments, the utilization factor may be based on: a number of accesses to the file for a measured time period, wherein files having a relatively greater number of accesses are written to a relatively outer zone and files having a relatively fewer number of accesses are written to a relatively inner zone; a size of the file, wherein files having a relatively larger size are written to a relatively outer zone and files having a relatively smaller size are written to a relatively inner zone; and a combination of a number of accesses to the file for a measured time period and a size of the file, wherein files having a relatively greater number of accesses and relatively larger size are written to a relatively outer zone and files having a relatively fewer number of accesses and relatively smaller size are written to a relatively inner zone.

Alternatively, the utilization factor may indicate a utilization rate for a measured period of time for a controller writing the file to the storage medium. In such case, files are written to relatively outer zones when the controller has a higher utilization rate and files are written to relatively inner zones when the controller has a relatively lower utilization rate.

The storage medium in certain implementations is a zone constant angular velocity (ZCAV) formatted, and comprises a hard disk drive, floppy disk or optical disk. Such a ZCAV media spins at a constant rotations per minute (RPM), so that outer zones, which inherently have more data sectors per revolution than inner zones, have a higher data rate than inner zones.

Further embodiments comprise a method, system, and program for rearranging a plurality of files on a storage medium zone formatted. For each of the plurality of files on the storage medium, a determination is made of a utilization factor associated with the file and a zone for the file based on the determined utilization factor. Each file is then written to the determined zone for the file.

Preferred embodiments provide a technique that determines a zone for a file based on a utilization factor, which indicates the need for a file to be associated with a certain data transfer rate. Those files having a higher utilization factor require higher data transfer rates,

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Disk Drive System

Figure 2:
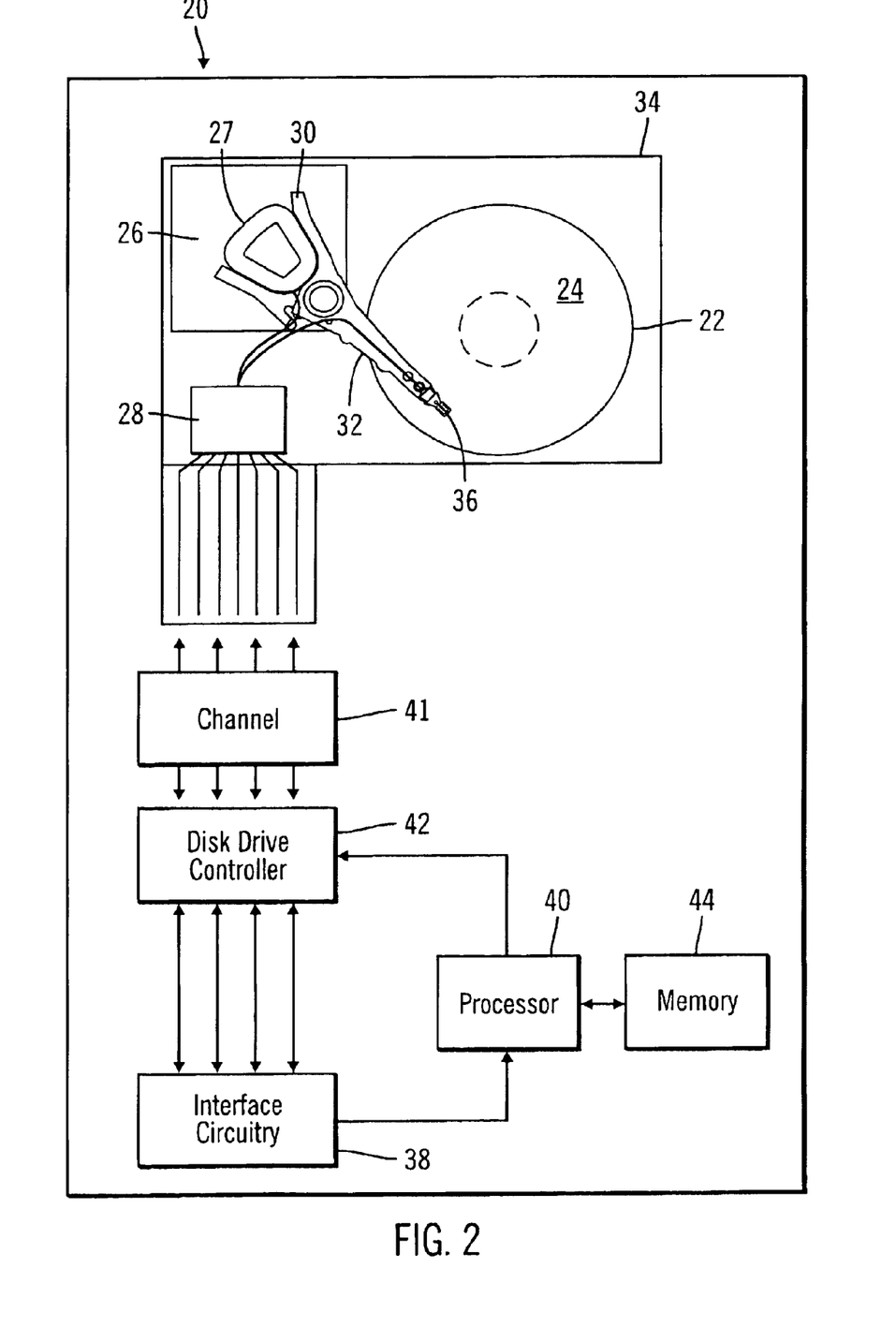
FIG. 2 illustrates a diagram of the hard disk drive components in which preferred embodiments of the present invention are implemented.

FIG. 2 illustrates a disk drive system 20 in which preferred embodiments are implemented. The disk drive system 20 comprises a rotating disk 22 having at least one recording surface 24 for storing information, a motor (not shown) for rotating the disk, an actuator assembly 26, arm electronics 28, an actuator arm 30, at least one suspension 32 connected to the arm 30, and a housing 34. The arm electronics 28 transmits electrical positioning information to position the actuator arm 30 in a plane substantially parallel to the recording surface 24, causing the suspension 32 to move along an arcuate path over the surface 24. A voice coil motor 27 moves actuator 30. A transducer 36 is held in close proximity to the recording surface 24 to read and write data to the disk. In certain implementations, the suspension 32 allows the read/write head to fly hydrodynamically along the surface of the disk 22. The transducer 36 may comprise a magnetoresistive (MR) or giant magnetoresistive (GMR) read/write head or compound actuator head structure as known in the art. The arm electronics 28 amplifies low-level signals from the MR or GMR head into high level signals for decoding in the channel. To minimize noise in the low level signal before amplification, the arm electronics is positioned close to the head. The design and arrangement of disk drive systems, which includes components not illustrated herein, are further described in "Magnetic Disk Drive Technology: Heads, Media, Channel, Interfaces, and Integration," by Kanu G. Ashar (1997) and U.S. Pat. No. 5,353,181, which publication and patent are incorporated herein by reference in their entirety.

Data may be stored on the storage medium surface 24 in concentric tracks as shown with respect to FIG. 1. Alternatively, spiral tracks may be used. In such an arrangement, user data record positions are formed as data sectors or blocks within a multiplicity of data tracks defined on each storage surface. Data is transferred from an external device, such as a computer bus, to interface circuitry 38. A processor 40 controls the flow of data received at the interface circuitry 38 to a disk drive controller 42, which then controls the transfer of the data to or from the recording surface 24. The processor 40 may be any suitable controller, microprocessor or other processing device capable of performing the operations described herein. The processor 40 receives I/O commands via the interface circuitry 38 and may queue the commands within a queue data structure stored in memory 44.

A read/write channel 41 between the disk drive controller 42 and arm electronics 38 encodes data for storage into a form suitable for the storage medium of the recording surface 24. This encoded data is then transmitted to the arm electronics 28, and then to the transducer head 36 for writing on the recording surface 24. When the transducer 36, e.g., MR head, senses or reads data from the recording surface 24, the data is transmitted in the encoded form via the arm electronics 28 to the read/write channel 41 for "decoding" into a form that is understandable to the device at the other end of the interface circuitry 38. The read/write channel 41 may further include an encoder/decoder to encode and decode data in a manner known in the art, and perform Error Correction Code (ECC), Cyclical Redundancy Check (CRC), Partial Response, Maximum Likelihood (PRML) operations, etc. in a manner known in the art.

For hard disk drives, the disk drive controller 42, processor 40, memory 44, and interface circuitry 38 could be included in the housing 34 of the disk drive system 20. In embodiments where the storage medium is embedded in a removable housing, such as an optical disk, floppy disk, etc., the disk drive controller 42, processor 40, memory 44, interface circuitry 38, and all the other electro-mechanical components would be embedded in a drive device in which the storage medium may be inserted.

In further embodiments, data may be stored on both surfaces of the disk 22. In such case, there would be multiple suspensions connected to the arm with transducer heads to read and write on both surfaces of the disk. Moreover, as known in the art, the disk drive may include a stack or platters of disks that are mounted coaxially on a spindle for simultaneous rotation. In such case, there would be multiple heads, one for each recording surface of each disk in the stack. In these multi-platter systems, a cylinder is formed of the combination of concentric rings on multiple disks along the same vertical axis.

Locations on the disk surface 24 are identified according to track or cylinder, head, and sector information. The tracks are the concentric circles on the disk surface 24. The tracks are numbered, starting from zero at the outside of the platter and increasing for tracks located inward. Data is accessed by moving the transducer head 36 radially among the circular tracks. In multiplatter systems, the head information indicates the head and disk at which to perform I/O operations. Each track may be further divided into individually accessible sectors, which are typically 512 byte blocks of data. In systems where there is a stack of disks, i.e., multiple platters, the radial position is defined by a cylinder which is formed from all the tracks on all the disks in the stack at the same radial position. A read or write command, such as a SCSI command, typically includes a starting LBA address of the command and a transaction length. The disk drive controller 42 maps the LBA to a cylinder, sector, and head to locate a specific data position on one of the disks, which is called a physical sector.

In embedded servo systems, the disk surface 24 also includes wedges of servo identification information (SID), shown as wedges 8a to 8h in FIG. 1, to identify the circumferential position on the disk. The wedges of SID markings are illustrated as 8a–8h in FIG. 1. When the transducer head 36 arrives at an SID, the SID information is used by the drive electronics to adjust the actuator 30 position to correct for any errors or determine circumferential slices of tracks. If the actuator arm is a linear actuator, then the servo edges would form a straight radial line, however, if the actuator arm is a rotating actuator, then the servo sectors would form an arc from the inner radius to the outer radius.

Figure 3:
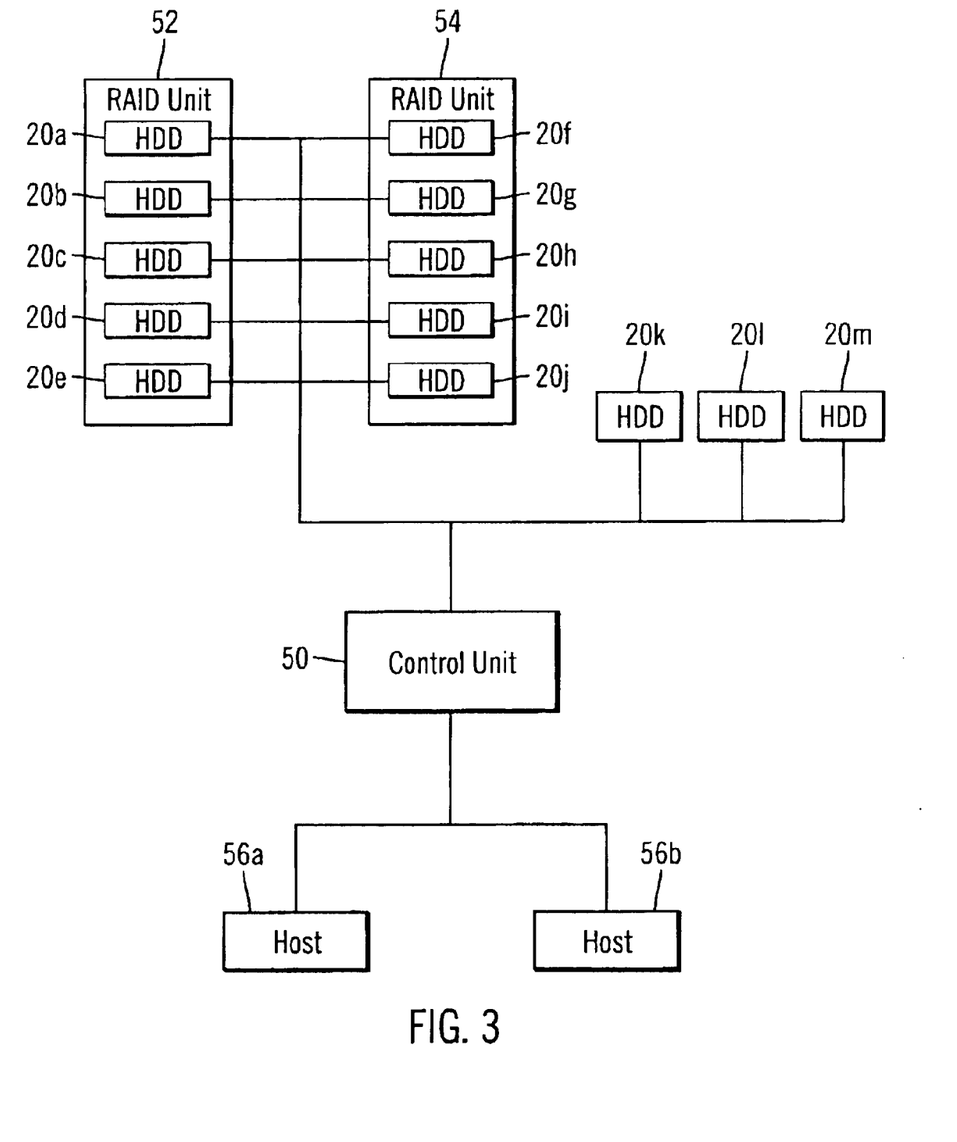
FIG. 3 illustrates a diagram of a control unit system providing input/output (I/O) access to hard disk drives in which preferred embodiments of the present invention are implemented.

FIG. 3 illustrates a further embodiment where a control unit 50 manages input/output (I/O) operations from hosts 56a, b to Redundant Arrays of Independent Disk (RAID) units 52 and 54 comprised of hard disk drives (HDD) 20a–e and 20f–j, respectively, and to stand alone hard disk drives (HDD) 20k–m.

Writing Data to the Zones

FIG. 1 illustrates a disk formatted into zones in a manner known in the art, where the disk comprises a zone constant angular velocity (ZCAV) storage medium, such as a hard disk drive, optical disk, floppy disk, etc. In prior art zone formatted disks, the outer zones have more sectors per track or zone than the inner zones, which comprise the inner tracks.

Figure 4:
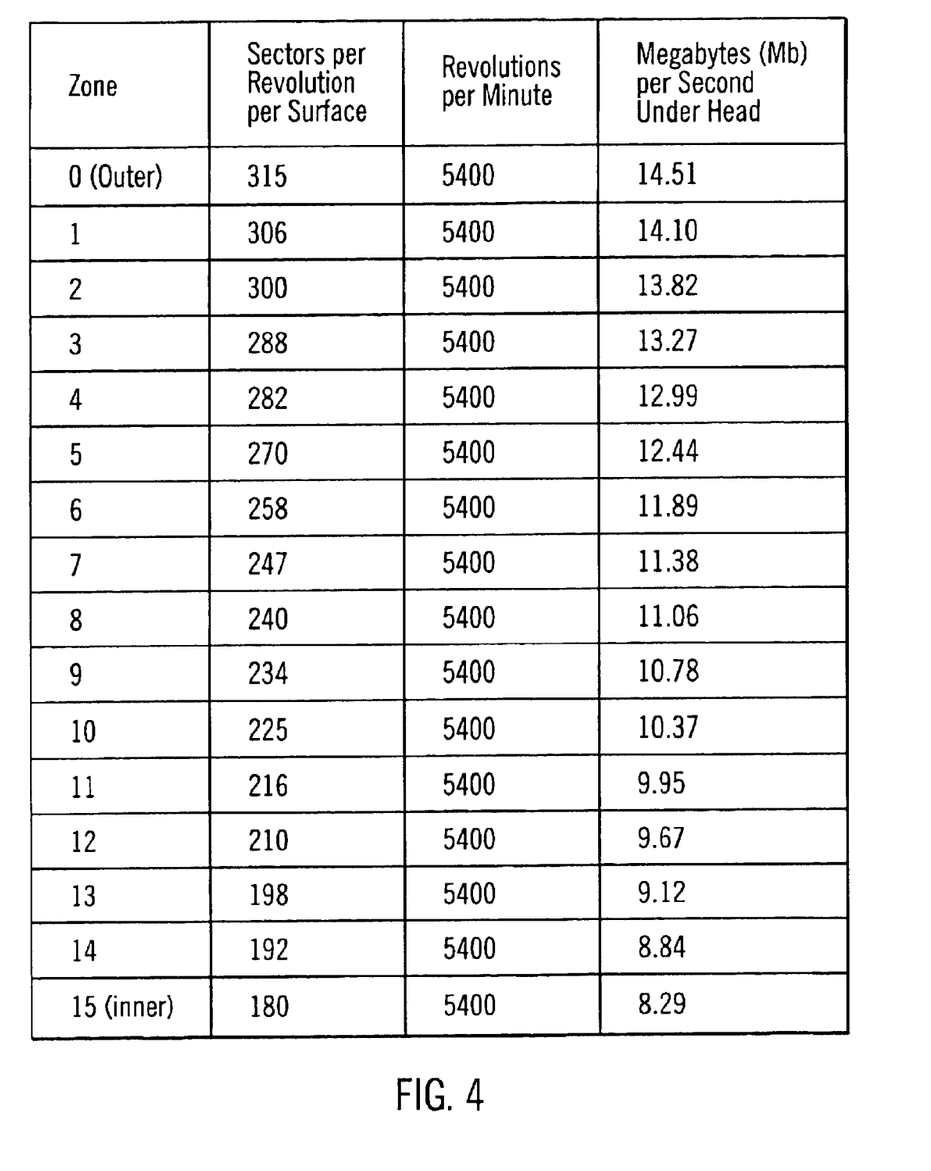
FIG. 4 provides a table indicating the megabytes per second transferred under a head for each zone formatted in a hard disk drive.

FIG. 4 comprises a table showing the data transfer rates per second for fifteen different zones, numbered from zero for the outermost zone to the highest number zone 15, which is the innermost zone. As shown in the table of FIG. 4, the outermost zones have greater sectors per zone as the tracks in the outermost zones have a greater circumference, thereby allowing more sectors than the inner zones. The second column shows that the outermost zones have a higher sectors per disk revolution than the inner zones. In the example of FIG. 4, the disk rotates at 5400 revolutions per minute. Assuming each sector comprises 512 bytes, the megabytes per second (fourth column) for a zone comprises the sectors per zone (second column) times the bytes per sector (512) times the revolutions per minute (third column) and divided by 60 seconds per minute. Thus, the outer zones have a higher data transfer rate in megabytes per second than the inner zones due to the greater angular density of sectors on the outer zones.

Figure 5:
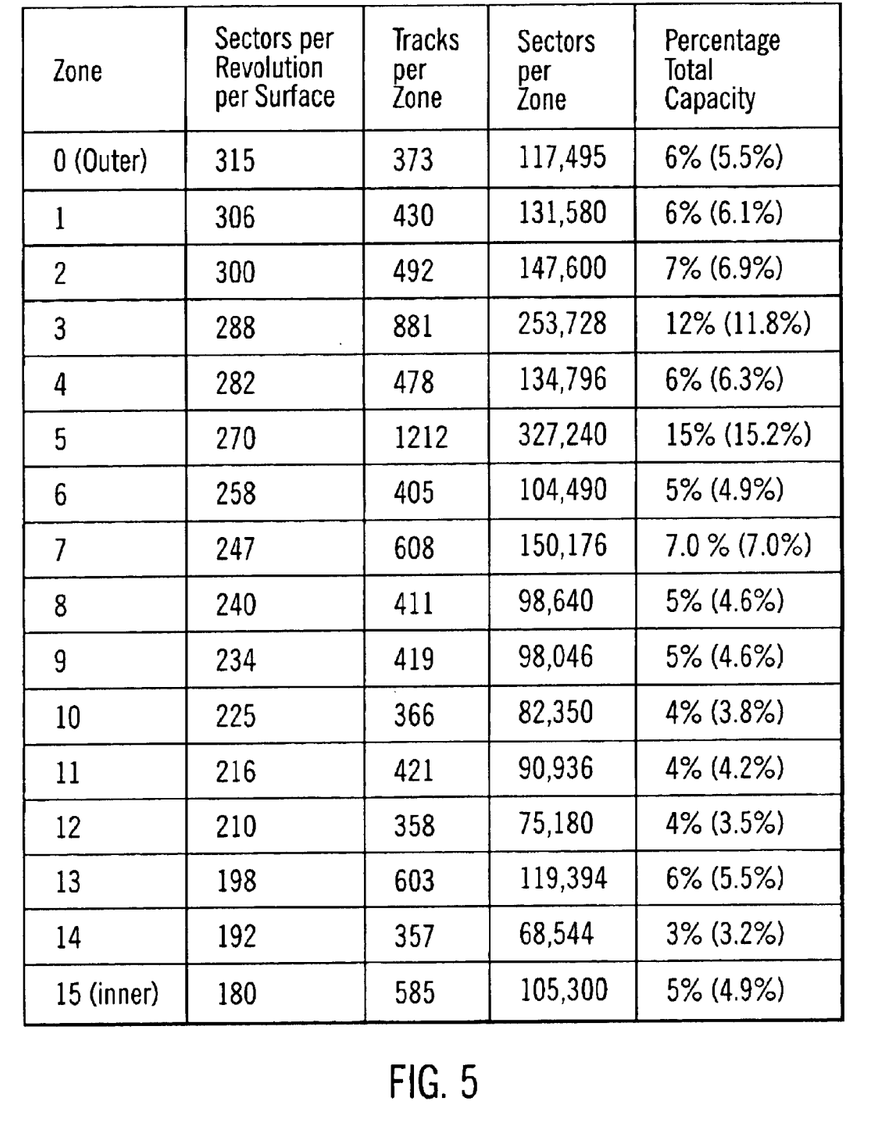
FIG. 5 provides a table indicating the sectors per zone on a hard disk drive.

FIG. 5 illustrates a table showing the number of sectors per zone per disk recording surface. The second column is the same as the second column in FIG. 3, the sectors per revolution per surface. The third column shows the number of tracks in a zone. Multiplying the second and third columns provides the sectors per zone as shown in the fourth column. The number of sectors of an inner zone may exceed the sectors in an outer zone if the inner zone includes more tracks than the outer zone. The fifth column shows the total capacity of each zone as a percentage of total disk capacity. The value in the parenthesis shows the exact percentage, rounded in the value to the left of the paren.

Preferred embodiments provide algorithms for determining which zone to write data depending on various utilization factors, such as the utilization history and size of the file being written. Because the outer zones have a greater data transfer rate, in one set of preferred embodiments, overall disk data transfers rates can be improved by writing the files that are more frequently utilized and larger to the outer zones. Smaller files and files utilized less frequently can be written to a relatively inner zone because slower data transfer rates for such files will not have as adverse an effect on performance as a slow data transfer rate for a larger or more frequently accessed file. For instance, database files or files used by the operating system, such as the file allocation table (FAT), should be written to the outermost zones as they are frequently accessed. Further database files such as a Microsoft Excel file or a Lotus 1-2-3 file can also be quite large and frequently accessed. (Microsoft is a registered trademark of Microsoft Corporation and Lotus is a registered trademark of International Business Machines Corporation).

Figure 6:
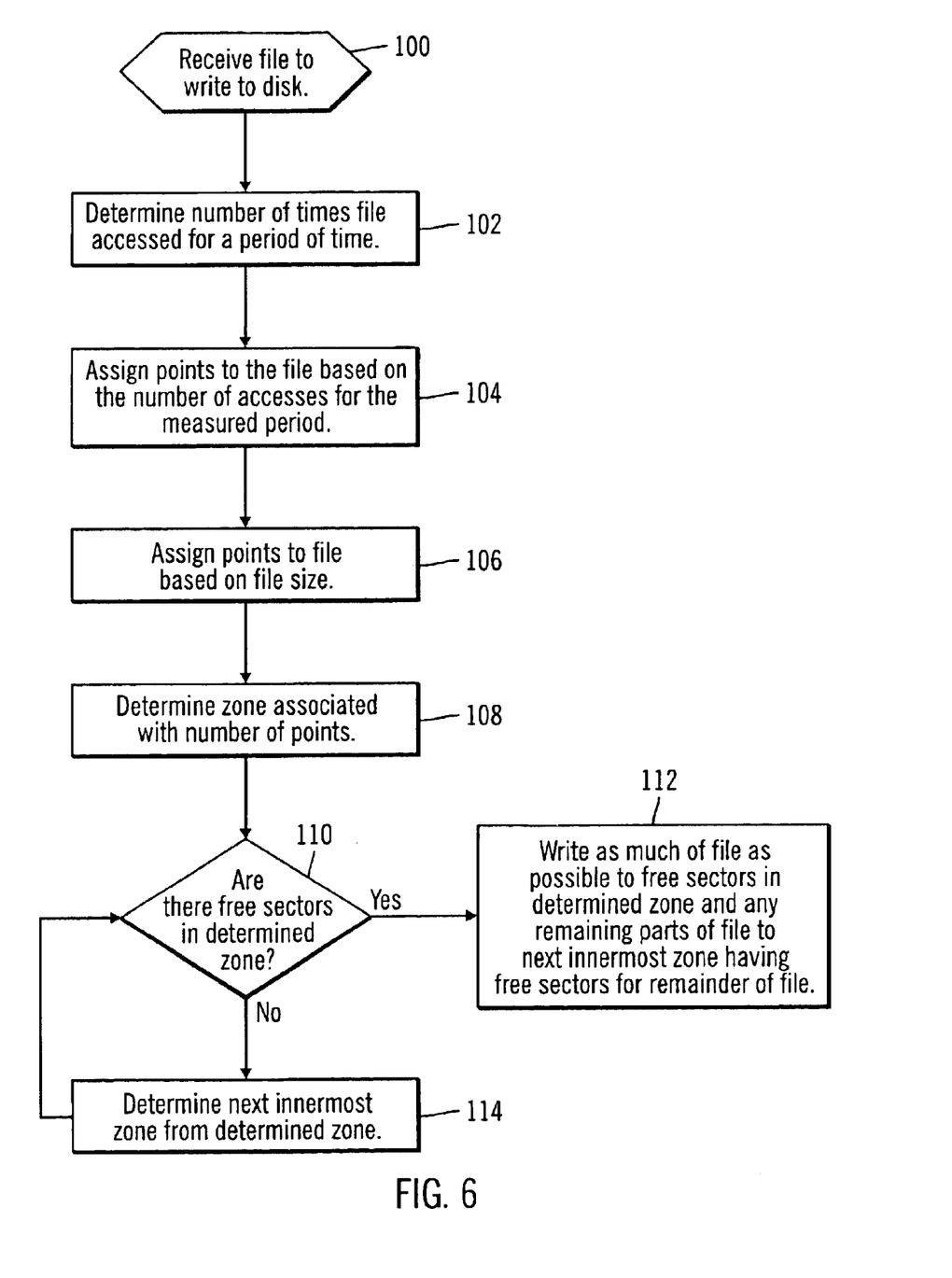
FIG. 6 illustrates logic to determine a zone for writing a file in accordance with preferred embodiments of the present invention.

FIG. 6 illustrates an algorithm implemented in the logic executed by the processor 40, such as the processor 40 firmware, to select a zone to write a file depending on the utilization history and size of the file. Control begins at block 100 with a file received at the interface circuitry 38. In response, the processor 40 determines (at block 102) the number of times the file has been accessed, i.e., the subject of input/output (I/O) requests for a predetermined period of time. The processor 40 may maintain a log of accesses to each file for the measured period of time in memory 44. The processor 40 then assigns (at block 104) points or weights to the file based upon the number of file accesses during the measured time period. The processor would further assign (at block 106) points based on the size of the file. The algorithm may provide numerous ways to weight or assign points for different utilization levels and file sizes, depending on whether the designer wants to improve the data transfer rate for larger files versus more utilized files.

The processor 40 would then determine (at block 108) a zone associated with the points assigned to the file. To determine a mapping of points to zones, the processor 40 may utilize an equation or access a table that assigns zone numbers to ranges of points. If (at block 110) there are free sectors in the determined zone, then the processor 40 directs the disk drive controller 42 to control the actuator 32 and head 36 to write (at block 112) as much of the file as possible to the free sectors in the determined zone and any remaining portions of the file to the adjacent innermost zone including free sectors until the entire file is written to the disk 22. If there are no free sectors, then the processor 40 determines (at block 114) the next innermost zone that includes free sectors and returns to block 110 to write the data to the next innermost zone. In alternative embodiments, the processor may proceed to the next outermost zone if there are no free sectors in the determined zone.

In control unit implementations shown in FIG. 3, the control unit 50 may select a zone based on the utilization of the control unit 50 managing I/Os to one of the disk drives 20a–m. The idea here is that a highly utilized control unit 50 can execute its write-data workload faster by writing to the high data-rate outer zones. This mitigates the control unit 50 from becoming a bottleneck. The utilization rate of the control unit 50 comprises the number of bytes that have flowed through the control unit 50 for a measured period of time divided by the maximum number of bytes that could flow through the control unit 50 for the measured time period. After determining the control unit 50 utilization, the control unit 50 would have to determine the zone that corresponds to the determined utilization.

In one embodiment, the control unit 50 may use equation (1) below to determine the zone (Z) as a function of N, the number of zones, and U, the control unit 50 utilization rate:

$$Z=INT[(1-U)*N] \qquad (1),$$

where INT is the integer function which rounds off the argument and $0<=U<=1$. The above equation (1) is preferably used when each zone has the same percentage capacity of the disk recording surface 24 storage capacity.

In another embodiment, the control unit 50 may determine a mapping of controller utilization rates to zones that takes into account that the capacity of each zone may vary. In one embodiment, a look-up table includes a 101 addressable locations. Each addressable location would identify a zone number. Each zone would be assigned a range of addresses corresponding to the percentage capacity of the total storage capacity of the particular zone, which is indicated in the fifth column of FIG. 5. For instance, if zone 0 comprised $P_0$ percent of the total storage capacity, then zone 0 would be assigned the first $P_0$ addresses. If zone 1 had comprised $P_1$ percent of the storage capacity, then zone 1 would be assigned the next P addresses in the memory, or the $(P_0+1)$th to the $(P_0+P_1)$th address, where each of the 101 addresses corresponds to the 0 to 100 different possible utilization capacity values of the disk drive controller 42. In other words, the first address assigned to the ith zone would comprise the number address determined from equation (2) below. The summation index j is used to sum the percent capacities of zones leading up to the (i−1)th zone.

$$\sum_{j=0}^{i-1} P_j + 1 \qquad (2)$$

The last address assigned to the ith zone would comprise the number address determined from equation (3) below:

$$\sum_{j=0}^{i} P_j \qquad (3)$$

Thus, for any given zone i, the content of the memory addresses in the range from the first address assigned to zone i as determined from equation (2) to the last address assigned to zone i as determined from equation (3) would indicate zone i. In this way, zones are mapped to utilization rates based on the percentage storage capacity of the zones, such that the outermost zones service the higher utilization rates and the innermost zones service the lower utilization rates. In this way, controllers having a higher utilization rate, i.e., transferring more data, write their data to the higher data transfer rate zones, such that the data transfer rate of the zone is able to match the controller utilization rate. INT(100*U) generates integers from 0 to 100, to map utilization U to the 101 discrete addresses.

The above equations (2) and (3) could be used to create a look-up table of percentage capacity controller utilization to zones that is stored in a non-volatile memory readily accessible to the processor 40, such as an electronically programmable read only memory (EPROM), or any other memory device known in the art. In alternative embodiments, the control unit 50 may use equations, such as equations(2) and (3) above, to determine the zone number corresponding to a particular control unit 50 utilization rate.

In alternative embodiments, the zone equations determined according to equation (1) may be used to map zone values (Z) to the 101 addresses based on the utilization rate (U) for each zone. In such embodiments, the zone values (Z) are included in the 101 addresses in the lookup table corresponding to the utilization rate (U) for the zone.

After determining a zone number based on the controller utilization, the control unit 50 would then proceed to transfer the file to the hard disk drive to write to sectors in the zone the control unit 50 determined according to steps 110 to 114 in FIG. 6.

One prior art problem with zone formatting is the use of zone constant angular velocity (ZCAV) formatted disks in redundant arrays of independent disk (RAID) arrays, such as shown in the RAID units 52 and 54 shown in FIG. 3. In RAID arrays, data from a file is striped across multiple disk drives in the array. If the disk drives are zone formatted, then in the prior art, the RAID controller, which is control unit 50 in FIG. 3, may stripe the file to different zones in the disks. If this occurs, then the data transfer rates for different stripes may be significantly different. In such case, the performance of the RAID controller is restricted to the performance of the stripe that takes the longest to write, which is the stripe written to the most innermost zone.

To avoid this problem observed in prior art RAID systems, in preferred embodiments, a zone would be selected using the zone selection techniques described above (based on a combination of file size and utilization history of the file or controller utilization). After selecting the zone according to the preferred embodiments, the RAID controller, or control unit 50, would then write all data stripes to the same zone on the different disks. This would ensure that the data transfer rate for all the disks is the same, thereby avoiding a situation where the RAID controller performance is limited to the performance of the most innermost zone of all the disks to which data is striped.

Figure 7:
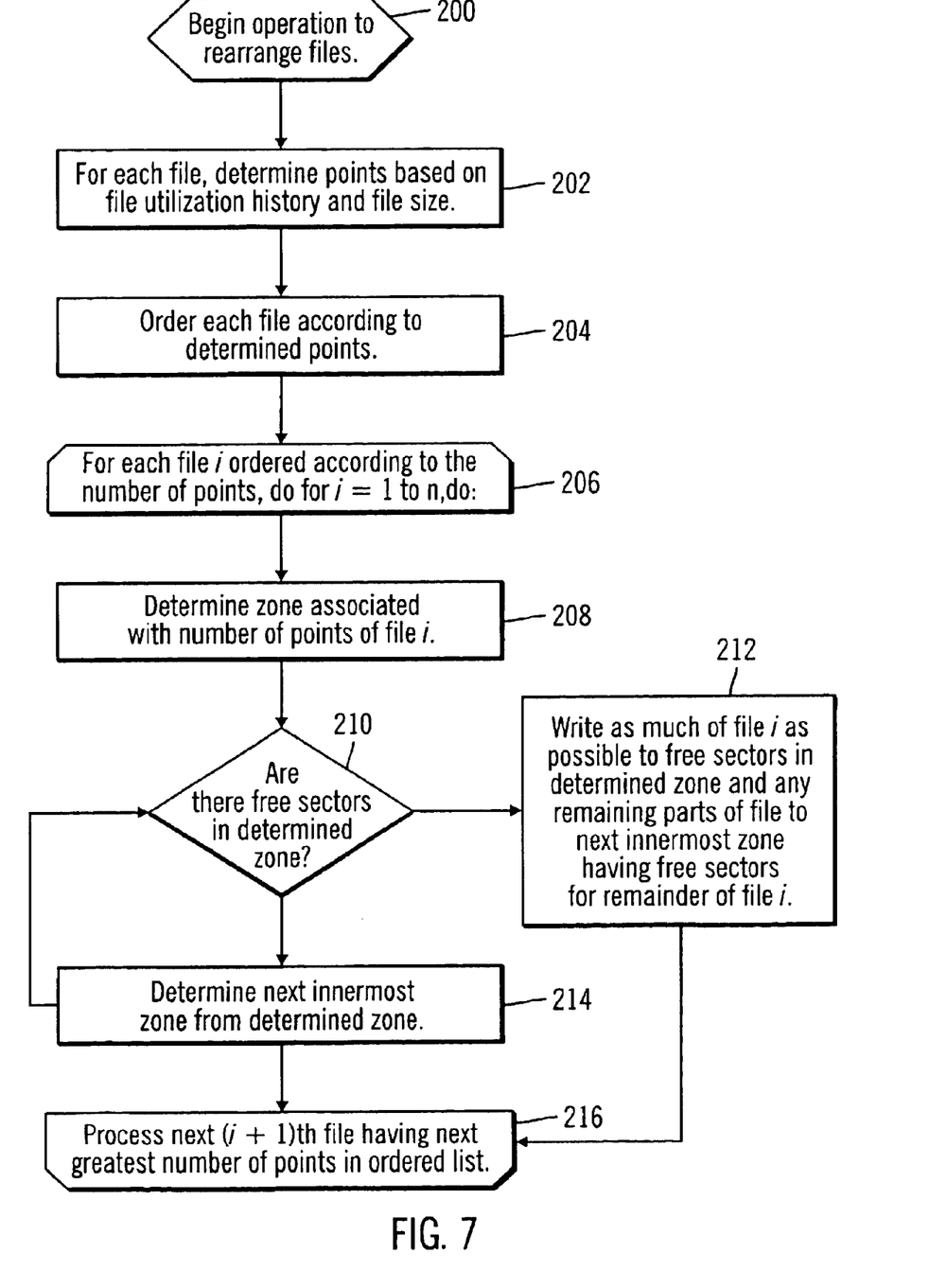
FIG. 7 illustrates logic to rearrange files on a disk recording surface in accordance with preferred embodiments of the present invention.

In still further embodiments, one zone assignment technique based on file size and file utilization history could be used to rearrange the storage of data on a disk during a clean-up operation or during low use hours. FIG. 7 illustrates logic implemented in the control unit 50 or the processor 40 within a disk drive system 20 or a separate software program to rearrange how files are written to the disk recording surface 24. At block 200, the process begins to rearrange the location of where files are stored on the disk recording surface 24. For each file, the number of points for the file is determined (at block 202), as a function of the file utilization history and the file size in a manner described above. The files are then ordered (at block 204) according to the number of points. A loop from blocks 206 to 216 is then performed for each file i in the ordering of files according to points, where the first file in the ordering has the greatest number of points, and the last file n in the ordering has the least number of points. For file i, the processor 40 determines (at block 208) the zone associated with the number of points in the manner discussed above. The processor 40 then performs steps 210 to 214 to write the file i to the determined zone in the same manner as described with respect to steps 110 to 114 in FIG. 6.

After the loop completes, the storage of files on the disk recording surface 24 is rearranged to place files having relatively higher utilization and size toward the outermost, faster data transfer zones, and files having relatively lower utilization and smaller size toward the innermost, slower data transfer zones. In preferred embodiments, the rearrangement of files on the disk recording surface 24 occurs locally to minimize the affect on the controller 42 utilization by having the controller 42 write files to different locations without transferring the data through the interface circuitry 38 to an application executing outside of the disk drive system 20.

With the logic of FIG. 7, the more frequently accessed files are migrated to the outer zones and the less frequently used files are migrated to the outer zones during a disk rearrangement or optimization operation.

Following are some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic of the preferred embodiments may be implemented in code that is capable of being transmitted from a server over a network, such as the Internet, to the disk drive electronics to reprogram the memory device storing the code for the processor 40. In this way, the code in the disk drive may be updated over a network.

Preferred embodiments were described as using embedded servo techniques to store the servo information indicating circumferential position on the disk surfaces. In alternative embodiments, other techniques may be used to place the servo information in the disk drive.

Preferred embodiments were described with respect to a hard disk drive. In alternative embodiments, the storage medium may comprise any zoned constant angular velocity (ZCAV) formatted medium, such as optical disks, floppy disks (including high density disks such as the Iomega Zip and Jaz disks** as well as standard floppy disks), etc. (Iomega. JAZ, and ZIP are registered trademarks of Iomega Corporation).

In the above described embodiments, zones were selected based on a utilization factor, such as a combination of the file size and file utilization history or a controller utilization. In alternative embodiments, different criteria may be used for the utilization factor. For instance, different files could be assigned to zones based on the utilization of the application accessing or creating the file. Applications that process data in real time, such as database applications, would be assigned the outermost zones as such files require faster access and data transfer time, i.e., have higher utilization. On the other hand, background operations, such as backup and archive operations, could be assigned to the innermost as such applications do not need to be performed at the faster data transfer rates as the data transfer time is not important, i.e., have lower utilization requirements.

In the previously described embodiments, the zones were selected on the basis of file size and utilization. However, some very large files may have portions that are heavily used (caused by locality of reference) compared to other portions of the file. These same algorithms (modified to recognize extents) can be used to place these highly used portions on the outer zones to improve performance of accesses to the highly used data.

In embodiments where files are rearranged on the disk surface, all the files or less than all the files may be subject to the rearranging operations of FIG. 7.

In the described embodiments, the logic of FIGS. 6 and 7 were described as implemented in the disk drive components, such as firmware of the processor 40. In alternative embodiments, the logic of FIGS. 6 and 7 may be implemented in an external application that determines the zone for a file and instructs the processor 40 embedded in the disk or disk drive to write the file to a location in the determined zone.

The preferred logic of FIGS. 6 and 7 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for writing data to a storage medium formatted into a plurality of zones, wherein each zone comprises at least one circumferential track, wherein each track comprises a plurality of addressable sectors, and wherein innermost zones have fewer sectors than outermost zones, comprising:

receiving a request to write a file to the storage medium;

determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;

determining one zone for the file based on the determined utilization factor; and writing the file to the determined zone.

2. The method of claim 1, further comprising:
selecting another zone having sufficient free sectors to store all or part of the file if the zone determined from the utilization factor does not have sufficient free sectors to store all of the file.

3. The method of claim 2, wherein the selected other zone is in an outward direction from the zone determined from the utilization factor.

4. The method of claim 2, wherein the selected other zone is in an inward direction from the zone determined from the utilization factor.

5. The method of claim 1, wherein the utilization rate is based an a number of accesses to to file for a measured time period, wherein files having a relatively greater number of access are written to a relatively outer zone and files having a relatively fewer number of accesses are written to a relatively inner zone.

6. The method of claim 1, wherein the utilization factor is based on a combination of the utilization rate for a measured time period and a size of the file, wherein files having a relatively greater number of accesses and relatively larger size are written to a relatively outer zone and files having a relatively fewer number of accesses and relatively smaller size are written to a relatively inner zone.

7. The method of claim 1, wherein the utilization factor is additionally based on an identity of an application writing to the file, wherein application programs preferring relatively higher data transfer rates are associated with a relatively outer zone and application programs that do not prefer high data transfer rates are associated with a relatively inner zone.

8. The method of claim 1, wherein U equals the utilization rate of the controller, which comprises the controller utilization for the measured period of time divided by a maximum possible utilization for the measured period, wherein N equals a number of zones, and wherein the zone (Z) to select is calculated as follows:

$$Z=INT[(1-U)*N].$$

9. The method of claim 1, wherein utilization rates are associated with zones based on a relative storage capacity of each zone, such that zones having a greater relative storage capacity are associated with a relatively greater number of different controller utilization rates.

10. The method of claim 9, further comprising:
maintaining a lookup table having an addressable location for each utilization rate, wherein each addressable location in the table indicates one zone, and wherein addressable locations of the lookup table identifying zones are associated with a number of controller utilization rates that corresponds to the relative storage capacity of the identified zone; and
wherein determining the zone based on the utilization factor comprises:
(i) determining an addressable location in the lookup table corresponding to a determined controller utilization rate; and
(ii) reading a zone identified at the determined addressable location, wherein the read zone comprises the selected zone.

11. The method of claim 1, wherein the storage medium is zone constant angular velocity (ZCAV) formatted.

12. The method of claim 11, wherein the storage medium comprises a hard disk, optical disk or floppy disk.

13. The method of claim 1, wherein the storage medium comprises a redundant array of independent disk (RAID) array of disks, wherein a RAID controller receives the request to write the file and determines the zone based on the utilization factor, and wherein the RAID controller writes the file to the determined same zone in each of the disks in the RAID array by stripping the file to the determined zone.

14. A method for rearranging a plurality of files on a storage medium zone formatted, wherein each zone comprises at least one circumferential track, wherein each track comprises a plurality of addressable sectors, and wherein innermost zones have fewer sectors than outermost zones, comprising:
for each of the plurality of files on the storage medium, comprising:
(i) determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;
(ii) determining a zone for the file based on the determined utilization factor; and
(iii) writing each file to the determined zone for the file.

15. The method of claim 14, wherein the plurality of files comprise all the files on the storage medium.

16. The method of claim 14, wherein the files are written to the storage medium according to an order of the utilization factors of the plurality of the files.

17. The method of claim 14, wherein files having a relatively greater number of access and relatively larger size are written to a relatively outer zone and files having a relatively fewer number of accesses and relatively smaller size are written to a relatively inner zone.

18. A system for writing data, comprising:
a storage medium formatted into a plurality of zones, wherein each zone comprises at least one circumferential track, wherein each track comprises a plurality of addressable sectors, and wherein innermost zones have fewer sectors than outermost zones;
means for receiving a request to write a file to the storage medium;
means for determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;
means for determining one zone for the file based on the determined utilization factor; and
means for writing the file to the determined zone.

19. The system of claim 18, further comprising:
means for selecting another zone having sufficient free sectors to store all or part of the file if the zone determined from the utilization factor does not have sufficient free sectors to store all of the file.

20. The system of claim 19, wherein the selected other zone is in an outward direction from the zone determined from the utilization factor.

21. The system of claim 19, wherein the selected other zone is in an inward direction from the zone determined from the utilization factor.

22. The system of claim 18, wherein the utilization rate is based an a number of accesses to the file for a measured time period, wherein files having a relatively greater number of access are written to a relatively outer zone and files having a relatively fewer number of accesses are written to a relatively inner zone.

23. The system of claim 18, wherein the utilization factor is based on a combination of the utilization rate for a measured time period and a size of the file, wherein files having a relatively greater number of accesses and relatively larger size are written to a relatively outer zone and files having a relatively fewer number of accesses and relatively smaller size are written to a relatively inner zone.

24. The system of claim 18, wherein the utilization factor is additionally based on an identity of an application writing to the file, wherein application programs preferring relatively higher data transfer rates are associated with a relatively outer zone and application programs that do not prefer high data transfer rates are associated with a relatively inner zone.

25. The system of claim 18, wherein U equals the utilization rate of the controller, which comprises the controller utilization for the measured period of time divided by a maximum possible utilization for the measured period, wherein N equals a number of zones, and wherein the zone (Z) to select is calculated as follows:

$$Z=INT[(1-U)*N].$$

26. The system of claim 18, wherein utilization rates are associated with zones based on a relative storage capacity of each zone, such that zones having a greater relative storage capacity are associated with a relatively greater number of different controller utilization rates.

27. The system of claim 26, further comprising:
 means for maintaining a lookup table having an addressable location for each utilization rate, wherein each addressable location in the table indicates one zone, and wherein addressable locations of the lookup table identifying zones are associated with a number of controller utilization rates that corresponds to the relative storage capacity of the identified zone; and
 wherein the means for determining the zone based on the utilization factor further performs:
  (i) determining an addressable location in the lookup table corresponding to a determined controller utilization rate; and
  (ii) reading a zone identified at the determined addressable location, wherein the read zone comprises the selected zone.

28. The system of claim 18, wherein the storage medium is zone constant angular velocity (ZCAV) formatted.

29. The system of claim 28, wherein the storage medium comprises a hard disk, optical disk or floppy disk.

30. The system of claim 18, wherein the storage medium comprises a redundant array of independent disk (RAID) array of disks, wherein a RAID controller receives the request to write the file and determines the zone based on the utilization factor, and wherein the RAID controller writes the file to the determined same zone in each of the disks in the RAID array by stripping the file to the determined zone.

31. A system for rearranging a plurality of files, comprising:
 a storage medium zone formatted, wherein each zone comprises at least one circumferential track, wherein each track comprises a plurality of addressable sectors, and wherein innermost zones have fewer sectors than outermost zones;
 means for performing, for each of the plurality of files on the storage medium:
  (i) determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;
  (ii) determining a zone for the file based on the determined utilization factor; and
  (iii) means for writing each file to the determined zone for the file.

32. The system of claim 31, wherein the plurality of files comprise all the files on the storage medium.

33. The system of claim 31, wherein the files are written to the storage medium according to an order of the utilization factors of the plurality of the files.

34. The system of claim 31, wherein files having a relatively greater number of access and relatively larger size are written to a relatively outer zone and files having a relatively fewer number of accesses and relatively smaller size are written to a relatively inner zone.

35. An article of manufacture for writing data to a storage medium formatted into a plurality of zones, wherein each zone comprises at least one circumferential track, wherein each track comprises a plurality of addressable sectors, and wherein innermost zones have fewer sectors than outermost zones, wherein the article of manufacture is comprised of code enabling operations comprising:
 receiving a request to write a file to the storage medium;
 determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;
 determining one zone for the file based on the determined utilization factor; and
 writing the file to the determined zone.

36. The article of manufacture of claim 35, wherein the code enables further operations comprising:
 selecting another zone having sufficient free sectors to store all or part of the file if the zone determined from the utilization factor does not have sufficient free sectors to store all of the file.

37. The article of manufacture of claim 36, wherein the selected other zone is in an outward direction from the zone determined from the utilization factor.

38. The article of manufacture of claim 37, wherein the selected other zone is in an inward direction from the zone determined from the utilization factor.

39. The article of manufacture of claim 35, wherein the utilization factor is based on a number of accesses to the file for a measured time period, wherein files having a relatively greater number of access are written to a relatively outer zone and files having a relatively fewer number of accesses are written to a relatively inner zone.

40. The article of manufacture of claim 35, wherein the utilization factor is based on a combination of the utilization rate for a measured time period and a size of the file, wherein files having a relatively greater number of accesses and relatively larger size are written to a relatively outer zone and files having a relatively fewer number of accesses and relatively smaller size are written to a relatively inner zone.

41. The article of manufacture of claim 35, wherein the utilization factor is additionally based on an identity of an application writing to the file, wherein application programs preferring relatively higher data transfer rates are associated with a relatively outer zone and application programs that do not prefer high data transfer rates are associated with a relatively inner zone.

42. The article of manufacture of claim 35, wherein U equals the utilization rate of the controller, which comprises the controller utilization for the measured period of time divided by the maximum possible utilization for the measured period, wherein N equals the number of zones, and wherein the zone (Z) to select is calculated as follows:

$$Z=INT[(1-U)*N].$$

43. The article of manufacture of claim 42, wherein utilization rates are associated with zones based on the relative storage capacity of each zone, such that zones having a greater relative storage capacity are associated with a greater number of controller utilization rates.

44. The article of manufacture of claim 43, wherein the code enables further operations comprising:

maintaining a lookup table having an addressable location for each utilization rate, wherein each addressable location in the table indicates one zone, and wherein addressable locations of the lookup table identifying zones are associated with a number of controller utilization rates that corresponds to the relative storage capacity of the identified zone; and wherein determining the zone based on the utilization factor comprises:
 (i) determining an addressable location in the lookup table corresponding to a determined controller utilization rate; and
 (ii) reading a zone identified at the determined addressable location, wherein the read zone comprises the selected zone.

45. The article of manufacture of claim 35, wherein the storage medium is zone constant angular velocity (ZCAV) formatted.

46. The article of manufacture of claim 45, wherein the storage medium comprises a hard disk, optical disk or floppy disk.

47. An article of manufacture for rearranging a plurality of files on a storage medium zone formatted, wherein each zone comprises at least one circumferential track, wherein each track comprises a plurality of addressable sectors, and wherein innermost zones have fewer sectors than outennost zones, wherein the article of manufacture is comprised of code enabling operations comprising:

for each of the plurality of files on the storage medium, comprising:
 (i) determining a utilization factor for the file indicating a utilization rate for a measured period of time for a controller writing the file to the storage medium, wherein files are written to relatively outer zones when the controller has a higher utilization rate and files are written to relatively inner zones when the controller has a relatively lower utilization rate;
 (ii) determining a zone for the file based on the determined utilization factor; and
 (iii) writing each file to the determined zone for the file.

48. The article of manufacture of claim 47, wherein the plurality of files comprises all the files on the storage medium.

49. The article of manufacture of claim 47, wherein the files are written to the storage medium according to an order of the utilization factors of the plurality of the files.

50. The article of manufacture of claim 47, wherein files having a relatively greater number of access and relatively larger size are written to a relatively outer zone and files having a relatively fewer number of accesses and relatively smaller size are written to a relatively inner zone.

* * * * *